US011781785B2

(12) United States Patent
Jayarathne et al.

(10) Patent No.: US 11,781,785 B2
(45) Date of Patent: Oct. 10, 2023

(54) FEEDBACK WARNING SYSTEM USING INDUCER PULSE WIDTH MODULATION SIGNAL

(71) Applicant: Johnson Controls Technology Company, Auburn Hills, MI (US)

(72) Inventors: Madhuka Manuranga Jayarathne, Wichita, KS (US); Andrew Michael Boyd, Wichita, KS (US); Theresa N. Gillette, Wichita, KS (US); Thomas D. Chase, Rose Hill, KS (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 445 days.

(21) Appl. No.: 16/569,353

(22) Filed: Sep. 12, 2019

(65) Prior Publication Data
US 2020/0292182 A1 Sep. 17, 2020

Related U.S. Application Data

(60) Provisional application No. 62/817,857, filed on Mar. 13, 2019.

(51) Int. Cl.
*F24D 19/10* (2006.01)
*F24F 11/30* (2018.01)
*F23N 3/08* (2006.01)

(52) U.S. Cl.
CPC .......... *F24D 19/1084* (2013.01); *F24F 11/30* (2018.01); *F23N 3/082* (2013.01); *F23N 2223/08* (2020.01); *G05B 2219/2614* (2013.01)

(58) Field of Classification Search
CPC ... F24F 11/30; F23N 3/082; G05B 2219/2614
See application file for complete search history.

(56) References Cited

U.S. PATENT DOCUMENTS

| | | | |
|---|---|---|---|
| 5,222,888 A | 6/1993 | Jones et al. | |
| 6,044,835 A | 4/2000 | Brown et al. | |
| 2005/0159844 A1* | 7/2005 | Sigafus | F23N 1/002 700/282 |
| 2012/0199109 A1* | 8/2012 | Thompson | F27D 7/04 126/112 |
| 2015/0330650 A1* | 11/2015 | Abiprojo | F24F 11/62 700/276 |
| 2020/0025374 A1* | 1/2020 | Scroggins | H02K 11/0094 |

* cited by examiner

*Primary Examiner* — Christopher E. Everett
*Assistant Examiner* — Yvonne Trang Follansbee
(74) *Attorney, Agent, or Firm* — Fletcher Yoder, PC (57) ABSTRACT

In an aspect, an HVAC system includes an inducer motor to provide combustion airflow, and a pressure sensor to measure an output airflow pressure of the inducer motor. The HVAC system may initiate the inducer motor, and receive a pulse width modulation (PWM) signal from the inducer motor, wherein the PWM signal indicates a PWM signal of the inducer motor corresponding to a predetermined airflow pressure of the inducer motor and measured by the pressure sensor. The HVAC system may compare the PWM signal to a baseline value, and control the inducer motor based on the comparing of the PWM signal to the baseline value. The HVAC system may also generate a status notification of the combustion airflow of the HVAC system in response to the comparing the PWM signal to the baseline value.

20 Claims, 4 Drawing Sheets

FEEDBACK WARNING SYSTEM USING INDUCER PULSE WIDTH MODULATION SIGNAL

CROSS-REFERENCE TO RELATED APPLICATION

This application claims the benefit of U.S. Provisional Application Ser. No. 62/817,857, entitled "FEEDBACK WARNING SYSTEM USING INDUCER PULSE WIDTH MODULATION SIGNAL" and filed on Mar. 13, 2019, which is expressly incorporated by reference herein in its entirety.

BACKGROUND

The present disclosure relates generally to heating, ventilation, and air conditioning (HVAC) systems, and more particularly, to a warning system for HVAC systems using an inducer pulse width modulation (PWM) signal.

In some HVAC system, including low nitrogen oxides (NOx) systems, efficient combustion airflow may be necessary to remove exhaust gases from a combustion chamber. However, in some instances, the combustion airflow may be blocked due to, for example, particles in a mesh or filter or one or more objects blocking an airflow of a flue. A blocked combustion airflow may prevent the HVAC system from initiating furnace operation or efficiently operating and, in some cases, may damage one or more components of the HVAC system. In typical HVAC systems, detection and warning systems for blocked combustion airflow may be costly, may add unnecessary complexity to the HVAC system, and may require a significant amount of space within the HVAC system. Accordingly, improvements are desired in HVAC systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for generating a status notification of a combustion airflow by a heating, ventilation, and air conditioning (HVAC) system.

In an aspect, an HVAC system may include an inducer motor configured to provide combustion airflow in the HVAC system, a pressure sensor configured to measure an output airflow pressure of the inducer motor, a memory configured to store a set of instructions, and a processor coupled with the memory and configured to execute the set of instructions. The processor may be configured to initiate an inducer motor within the HVAC system. The processor may also be configured to send a pulse width modulation (PWM) signal to the inducer motor, wherein the PWM signal corresponds to a predetermined airflow pressure of the inducer motor and measured by the pressure sensor. The processor may further be configured to compare the PWM signal to a baseline value. The processor may also be configured to control the inducer motor based on the comparing of the PWM signal to the baseline value. The processor may further be configured to generate a status notification of the combustion airflow of the HVAC system in response to the comparing the PWM signal to the baseline value.

In another aspect, a method for generating a status notification of a combustion airflow by an HVAC system is disclosed. The method may include initiating an inducer motor within the HVAC system, the inducer motor configured to provide the combustion airflow in the HVAC system. The method may also include receiving an output airflow pressure of the inducer motor from a pressure sensor. The method may include sending a PWM signal to the inducer motor, wherein the PWM signal corresponds to a predetermined airflow pressure of the inducer motor and received from the pressure sensor. The method may further include comparing the PWM signal to a baseline value. The method may include controlling the inducer motor based on the comparing of the PWM signal to the baseline value. The method may also include generating a status notification of the combustion airflow of the HVAC system in response to the comparing the PWM signal to the baseline value.

In another aspect, a computer-readable medium storing computer executable code for generating a status notification of a combustion airflow by an HVAC system is disclosed. The computer-readable medium may include code to initiate an inducer motor within the HVAC system, the inducer motor is configured to provide the combustion airflow in the HVAC system. The computer-readable medium may also include code to receive an output airflow pressure of the inducer motor. The computer-readable medium may include code to send a PWM signal to the inducer motor, wherein the PWM signal corresponds to a predetermined airflow pressure of the inducer motor and received from the pressure sensor. The computer-readable medium may further include code to compare the PWM signal to a baseline value. The computer-readable medium may include code to control the inducer motor based on the comparing of the PWM signal to the baseline value. The computer-readable medium may also include code to generate a status notification of the combustion airflow of the HVAC system in response to the comparing the PWM signal to the baseline value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide systems, methods, and computer-readable medium for generating a status notification of a combustion airflow by a heating, ventilation, and air conditioning (HVAC) system. In an HVAC system, an inducer motor removes any gas remaining from a previous combustion cycle from a furnace via a flue. In some cases, efficient combustion airflow or furnace ignition may be prevented due to, for example, a filter or a mesh of a premix burner accumulating particles, or the flue being blocked by one or more objects. A typical warning system, which may include airflow sensors, power analyzers, or filter exchange timers are either costly, consume a significant amount of space within the HVAC system, or do not provide sufficient warning of the combustion airflow being blocked.

The present disclosure uses a pulse width modulation (PWM) signal to control inducer motor work performance. Unlike analyzing power measured in watts directly, the PWM signal allows a comparative measurement. In an aspect, a controller may initiate an initial run of the inducer motor. When the inducer motor reaches a predetermined airflow pressure, the controller may record an initial PWM signal (baseline value or field set baseline value) corresponding to the predetermined airflow pressure. The initial PWM signal may be recorded, for example, when the HVAC system is initially setup at a location (e.g., a first time run of the inducer motor in the HVAC system). The initial PWM signal may be a baseline value used for comparing whether the inducer motor requires a different PWM value to reach the predetermined airflow pressure. Each baseline value may be specific to setup (e.g., mountainous install, varying vent and/or air intake pipe lengths) of the HVAC system. The controller may use the baseline value to compare at set point operation how much a subsequent PWM signal deviates from the baseline value. The controller may issue a warning alert and/or a critical alert based on a deviation. For example, an alert (e.g., warning or critical) may be issued if a deviation percentage exceeds a threshold percentage from the baseline value.

Use of the PWM signal, as described in the present disclosure, may provide a low cost, warning system for an HVAC system, as compared to a conventional warning system. Use of the warning system of the present disclosure may provide an up-to-date notification of a blockage in the combustion airflow as a result of heat exchanger soot preventing oxygen in combustion air, excess pollutants and emissions due to combustion mixture changes from the lack of fresh air flow, or any other blockage in the combustion airflow.

Turning now to the figures, example aspects are depicted with reference to one or more components described herein, where components in dashed lines may be optional.

Figure 1:
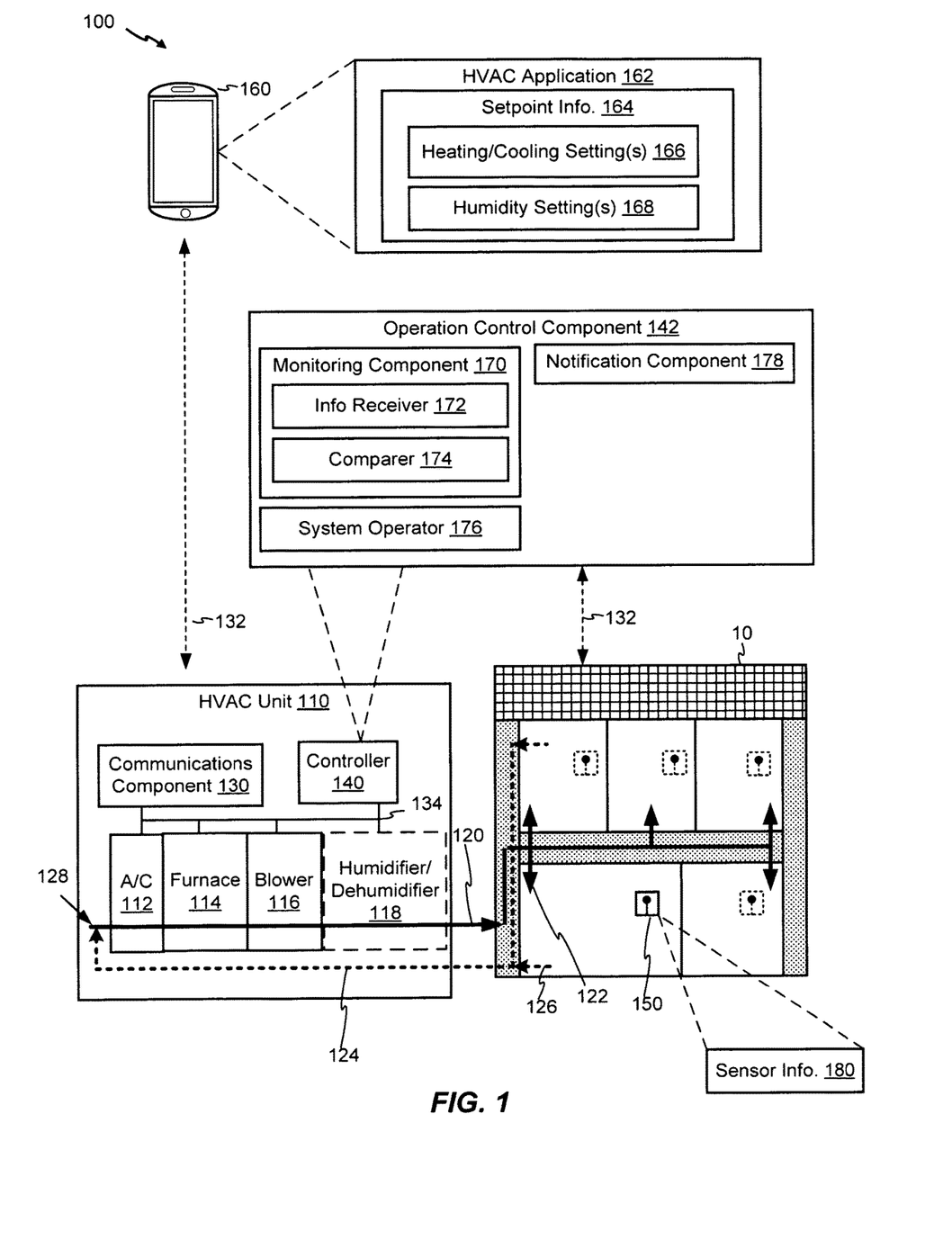
FIG. 1 is a block diagram of an example heating, ventilation, and air conditioning (HVAC) system, according to aspects of the present disclosure.

Referring to FIG. 1, an HVAC system 100 for a building 10 is disclosed. The HVAC system 100 may include an HVAC unit 110 configured to control an ambient condition of the one or more areas (e.g., rooms) of the building 10 based on information from one or more sensors 150 and a mobile device 160. In an example, an ambient condition may be a temperature or a humidity level of one or more areas of the building 10. As shown by FIG. 1, the HVAC unit 110 may be external to the building 10. Alternatively, in some aspects, one or more components (e.g., air conditioning (A/C) unit 112, furnace 114, blower 116, humidifier/dehumidifier 118, communications component 130, or controller 140) may be located in different locations including inside the building 10. Examples of the building 10 may include a home, an office, or any other structure that may use an HVAC system for controlling one or more ambient conditions of the structure.

In an aspect, the HVAC system 100 may include supply ducts 120 and return ducts 124 installed within the building 10 and coupled with the HVAC unit 110. The supply ducts 120 may supply air to the building 10, and the return ducts 124 may return air from the building 10. The supply ducts 120 may receive supply air through one or more of intakes 128 that provide outside air to the HVAC system 100 and/or may recycle return air from the return ducts 124. The supply ducts 120 may output the supply air at one or more of the areas of the building 10 via one or more supply vents 122. The return ducts 124 may receive return air from the building 10 via the return ducts 124 to balance air within the building 10. The return air may be input into the return ducts 124 via one or more return vents 126.

The HVAC unit 110 may include one or more of an A/C unit 112, a furnace 114, a blower 116, a humidifier/dehumidifier 118, or any other component for adjusting an ambient condition of an area (e.g., room) of the building 10. The A/C unit 112 may be configured to cool the supply air by passing the supply air through or around one or more cooled pipes (e.g., chiller pipes) to lower a temperature of the supply air. The furnace 114 may be configured to warm the supply air by passing the supply air through or around one or more warmed pipes (e.g., heating coils) to raise a temperature of the supply air. The blower 116 may be configured to blow the supply air through the supply ducts 120 to the building 10 and pull the return air from the building 10. The humidifier 118 may be configured to add moisture to the supply air, and the dehumidifier 118 may be configured to reduce moisture in the supply air. While the humidifier/dehumidifier 118 is shown as a single unit, these units may be separate units. Alternatively to a dehumidifier 118, aspects of dehumidification may be performed through other methods including use of the A/C unit 112 to dehumidify the supply air.

The HVAC unit 110 may also include a communications component 130 configured to communicate with the one or more sensors 150 and/or the mobile device 160. In an aspect, the communications component 130 may communicate with the one or more sensors 150 and/or the mobile device 160 via one or more communications links 132. In an example, the communications component 130 may include one or more antennas, processors, modems, radio frequency components, and/or circuitry for communicating with the sensors 150 and/or the mobile device 160. The one or more communications links 132 may be one or more of a wired communication link or a wireless communication link.

The HVAC system 100 may also include the one or more sensors 150 located within one or more areas of the building 10 and/or within or near the supply vents 122. One or more sensors 150 may be configured to detect an ambient condition such as a temperature or a humidity level of the area where the sensor 150 is located. Each of the sensors 150 may provide sensor information 180 to the HVAC unit 110. Examples of a sensor 150 may include a temperature sensor, a humidity sensor, or any sensor configured to detect an ambient condition of one or more areas of the building 10.

The HVAC system 100 may also include the mobile device 160 configured to communicate with the HVAC unit 110. The mobile device may include an HVAC application 162 configured to display, adjust, and store setpoint information ("info") 164 indicating desired user settings for one or more areas of the building 10. In an example, the setpoint information 164 may include heating/cooling settings 166 indicating one or more desired temperatures (e.g., minimum and/or maximum area temperatures) for one or more areas of the building and/or humidity settings 168 indicating a desired humidity level for one or more areas of the building 10. The mobile device 160 may provide the setpoint information 164 to the HVAC unit 110. Examples of a mobile device 160 may include a cellular phone, a smart phone, a personal digital assistant (PDA), a smart speaker, a home assistant, a wireless modem, a wireless communication device, a handheld device, a tablet computer, a laptop computer, a cordless phone, a smart watch, an entertainment device, an Internet of Things (IoT) device, or any device capable of communicating with the HVAC unit 100. A smart speaker may include, for example, an Echo® device available from Amazon, Inc. of Seattle, Wash., a Google Home® device available from Google, Inc. of Mountain View, Calif., or other similar voice-controlled devices. The HVAC application 162 may include a voice interface that responds to voice commands.

The HVAC unit 110 may also include a controller 140 configured to control the A/C unit 112, the furnace 114, the blower 116, and the humidifier/dehumidifier 118, based on the sensor information 180 received from the sensor 150 and the setpoint information 164 received from the mobile device 160. While the controller 140 is shown in FIG. 1 as being located external to the building (e.g., within HVAC unit 110), aspects of the present disclosure do not limit the controller 140 to this location. For example, the controller 140 may be located within an area of the building 10 and/or combined with one or more sensors 150.

The controller 140 may communicate with the communications component 130, the A/C unit 112, the furnace 114, the blower 116, and/or the humidifier/dehumidifier 118 via a communications bus 134. The controller 140 may include logic to operate the A/C unit 112, the furnace 114, the blower 116, and the humidifier/dehumidifier 118, based on the sensor information 180 and the setpoint information 164. The operation of the components of the HVAC unit 110 may include one or more of an initiation time, a stop time, a run time, a power state, speed level, a heating/cooling level, and/or any other operational state of one or more of these components of the HVAC unit 110.

In an aspect, the controller 140 may include an operation control component 142 to perform the logic of the controller 140. The operation control component 142 may include a monitoring component 170 configured to monitor and compare the setpoint information 164 and the sensor information 180. In an example, the monitoring component 170 may include an information receiver 170 configured to receive one or more of the setpoint information 164 or the sensor information 180. The monitoring component 170 may also include a comparer 174 configured to receive one or more of the setpoint information 164 or the sensor information 180 from the information receiver 172 and determine a difference between the setpoint information 164 (or stored setpoint information) and the sensor information 180.

In an aspect, the operation control component 142 may also include a system operator 176 configured to determine one or more operational states for controlling one or more functions of the components (e.g., A/C unit 112, furnace 114, blower 116, humidifier/dehumidifier 118) of the HVAC unit 110 and control the components based on the determined operations. For example, the system operator 176 may determine one or more of an initiation time, a stop time, a run time, a power state, speed level, or a heating/cooling level, of one or more of the components and control the components according to the operational state(s).

In an example, the system operator 176 may receive information on the difference between the setpoint information 164 (or stored setpoint information) and the sensor information 180 from the comparer 174 and determine an operational state of the components. The system operator 176 may compare the difference between the setpoint information 164 (or stored setpoint information) and the sensor information 180 and determine whether the difference is within a threshold range. The system operator 176 may determine operational states based on a result of the determination.

While the controller 140, the communications component 130, the sensors 150, and the mobile device 160 are shown separately in FIG. 1, aspects of the present disclosure do not limit the functionality of these components being separated. For example, one or more of the functionalities of the controller 140, the communications component 130, the sensors 150, or the mobile device 160 may be combined (e.g., thermostat) so that a user may access the functionalities within the building 10.

Figure 2:
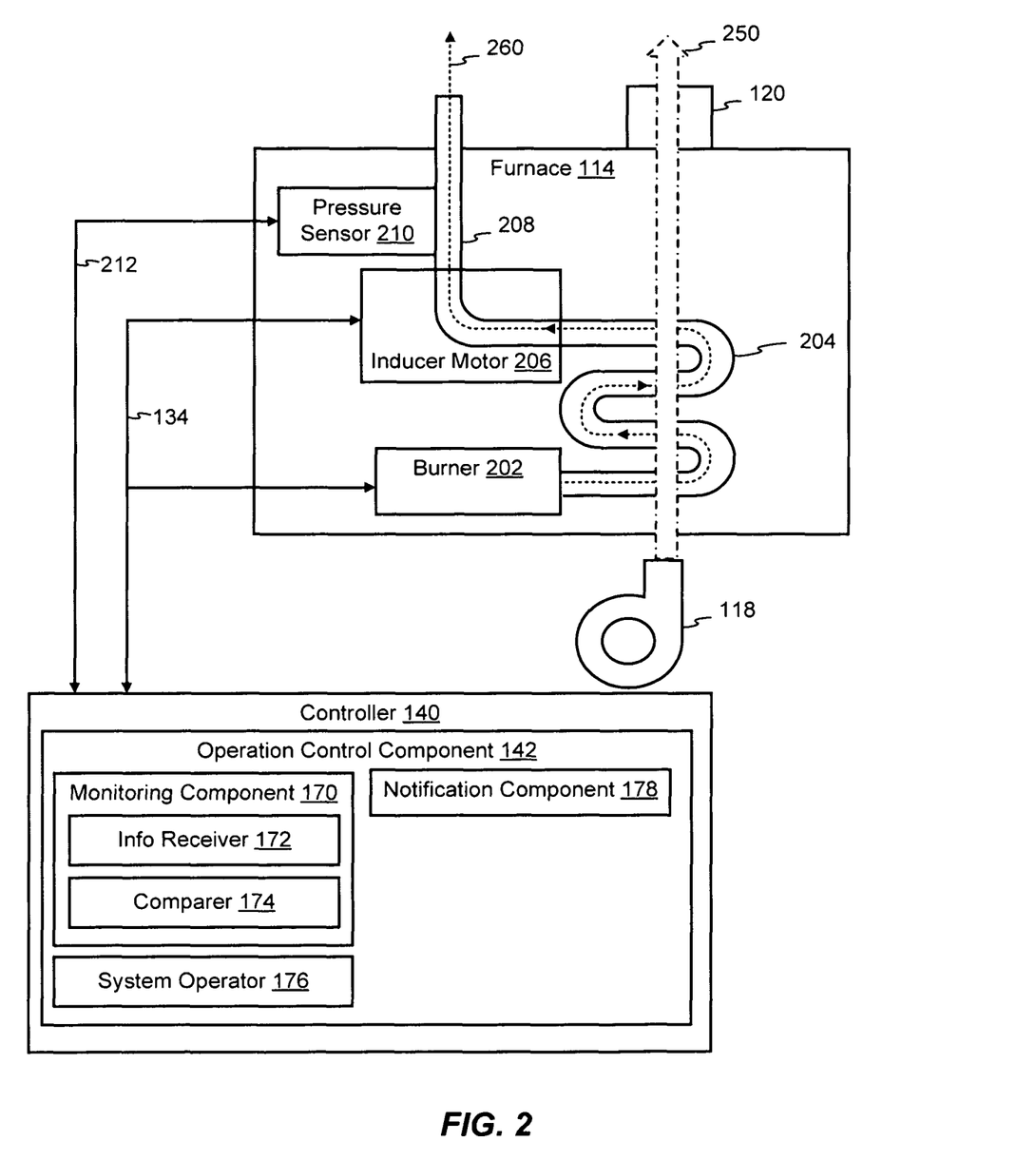
FIG. 2 is a block diagram of an example of functions of a furnace, according to aspects of the present disclosure.

Referring to FIG. 2, an example of a heating cycle of the furnace 114, according to aspects of the present disclosure, is provided. As shown, the furnace 114 may include a burner 202 configured to release and burn a gas (e.g., natural gas or propane) within a heat exchanger 204. The heat exchanger 204 may be a set of pipes and, in some examples, fins, configured to transfer heat from the pipes to air that passes over (externally) the heat exchanger 204.

During a heating cycle, the blower 118 may pass air along a supply airflow 250 such that the air passes over the heat exchanger 204 to heat the air. The air, after having passed over the heat exchanger 204, is pushed to the building 10 via the supply duct 120, as described herein.

The furnace 114 may also include an inducer motor (e.g., blower) 206 configured to pull air/gas from the burner 202 and the heat exchanger 204 and vent the air/gas out of a flue 208. The combustion airflow 260 may be the path air/gas follows from the burner 202 through the heat exchanger 204, the inducer motor 206, and the flue 208. The inducer motor 206 may be powered by a voltage (e.g., 110 VAC) and a controlled via a PWM signal. In some examples, the inducer motor 206 may initiate prior to an initiation of the burner 202 in order to clear the air/gas in the combustion airflow 260 that may have remained from a prior heating cycle. Clearing the air/gas from the combustion airflow 260 prior to the initiation of the burner 202, provides a controlled burn for the burner 202 (e.g., prevents uncontrolled explosions in heat exchanger 204 from left over gas). Further, the inducer motor 206 may remain running while the burner 202 is burning to provide a source of oxygen to the burner 202 and allow the burner 202 to burn efficiently.

The furnace 114 may also include a pressure sensor 210 configured to measure an output airflow pressure of the inducer motor 206. The pressure signal 210 may be located at or near the output of the inducer motor or any location to measure an output/input airflow force of the inducer motor (e.g., anywhere within the flue 208).

In some situations, a combustion airflow may be blocked. Blockage may occur do to any number of reasons, for example, soot or particles caught in a mesh or filter of a premix burner, one or more objects covering the flue, and/or a general build-up of soot or particles along the combustion airflow corresponding to one or more of the burner 202, the heat exchanger 204, the inducer motor 206, or the flue 208.

In an aspect, the controller 140 may monitor the inducer motor 206 and generate a status notification based on a PWM signal. A change in the PWM signal to the inducer motor 206 from a baseline value may indicate that the combustion airflow is blocked. For example, when the combustion airflow is blocked (either partially or wholly), the inducer motor 206 may become strained and require the PWM to run at a higher duty cycle in order to reach a desired airflow pressure. Accordingly, the monitoring component 170 may be configured to monitor the PWM (PWM signal) via, for example, a communication bus 212 and also monitor an output airflow pressure via the pressure sensor 210. When the output airflow pressure reaches a predetermined airflow pressure, the monitoring component 170 may verify the PWM signal to the inducer motor 206 at the predetermined airflow pressure. The comparer 174 may then compare the PWM signal to a baseline value. The baseline value may indicate a baseline PWM signal corresponding to a desired airflow pressure of the inducer motor 206. In an aspect, one or more of the baseline PWM signal or the predetermined airflow pressure may be based on a manufacture, installer, or user setting. In another aspect, one or more of one or more of the baseline PWM signal or the predetermined airflow pressure may be based on an initial setup of one or more components of the HVAC system 100. For example, when the inducer motor 206, the furnace 114, and/or the HVAC unit 110 is initially setup, the controller 140 (or one or more subcomponents) may initiate the inducer motor 206. The controller 140 (or one or more subcomponents) may monitor the airflow pressure of the inducer motor 206 via the pressure sensor 210. When the output airflow pressure of the inducer motor 206 reaches a predetermined airflow pressure, the controller 140 (or one or more subcomponents) may record the PWM signal corresponding to the predetermined airflow pressure. The recorded PWM signal may be the baseline value. Alternatively, the controller 140 (or one or more subcomponents) may determine a baseline range (e.g., +/−10% deviation) from the recorded PWM signal, and the baseline range may be used by the controller 140 as the baseline value.

During a heating cycle of the furnace 114, the monitoring component 170 may monitor the PWM to the inducer motor 206 and monitor the output airflow pressure via the pressure sensor 210. When the output airflow pressure reaches the predetermined airflow pressure, the PWM signal, which indicates a PWM signal of the inducer motor corresponding to the predetermined airflow pressure is verified, and the comparer 174 may compare the PWM signal to the baseline value.

Based on the comparison, the system operator 176 may control the inducer motor 206. For example, if the PWM signal matches the baseline value, the inducer motor 206 may be operating at a normal state. However, if the PWM signal exceeds the baseline value or another threshold, the inducer motor 206 may be operating at a warning state.

Further, a notification component 178 of the operation control component 142 may generate a status notification based on the comparison. For example, the notification component 178 may generate a status notification of a normal status to indicate the combustion airflow is not blocked, a warning status to indicate the combustion airflow is at least partially blocked, or a critical status to indicate the combustion airflow is largely blocked.

In some examples, the notification component 178 may determine a deviation of the PWM signal from the baseline value, and generate the status notification of the combustion airflow further based on the deviation. The notification component 178 may further compare the deviation to a first threshold and/or a second threshold to determine whether a deviation percentage exceeds a threshold percentage from the baseline value. When the deviation is satisfies the first threshold, the notification component 178 may generate the normal status. When the deviation exceeds the first threshold but does not exceed the second threshold, the notification component 178 may generate the warning status. When the deviation exceeds the second threshold, the notification component 178 may generate the critical status.

Figure 3:
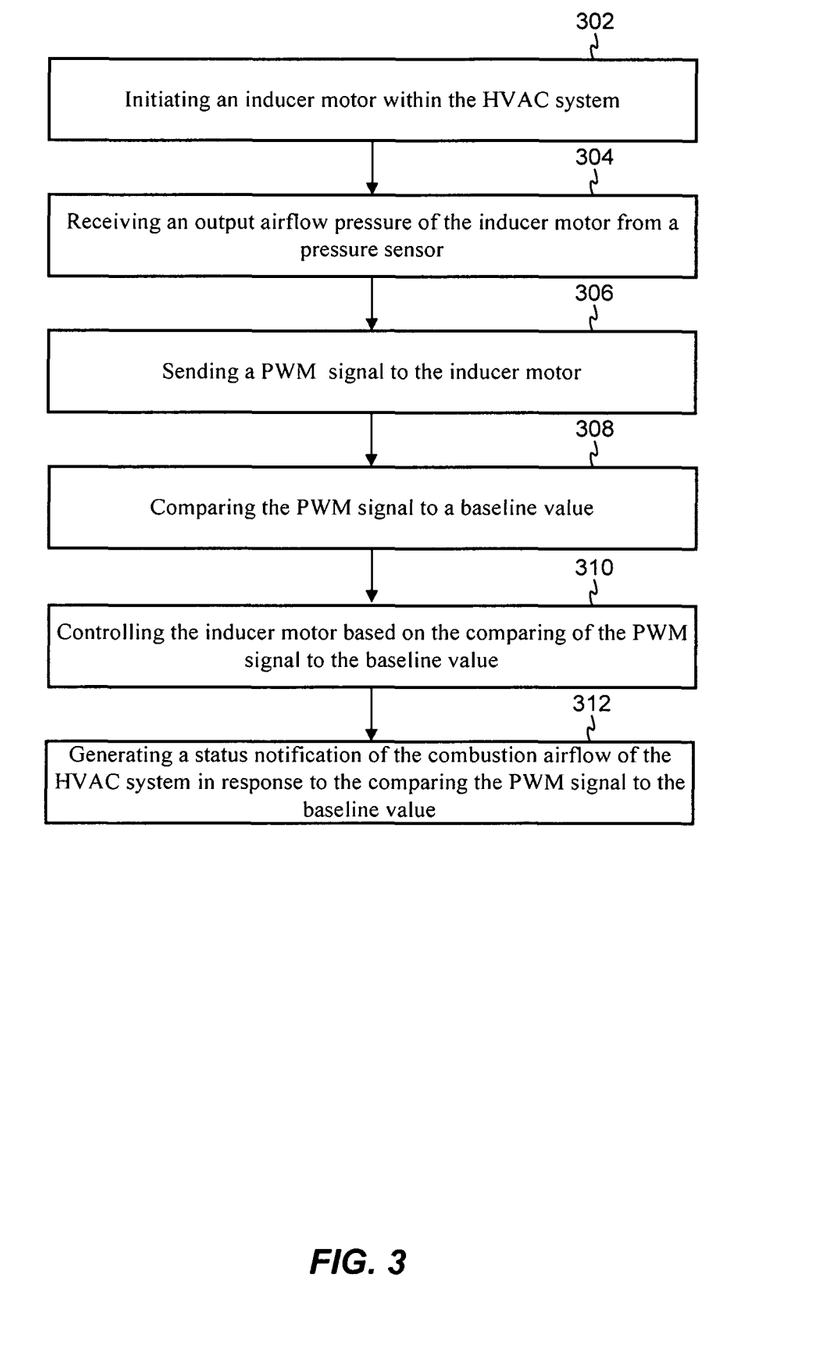
FIG. 3 is a flowchart of an example method, according to aspects of the present disclosure.

Referring to FIG. 3, an example of a method 300 for generating a status notification of a combustion airflow by the HVAC system 100 is disclosed. The method 300 may implement the functionality described herein with reference to FIGS. 1 and 2 and may be performed by one or more components of the HVAC system 100 as described herein with reference to FIGS. 1, 2, and 4.

At 302, the method 300 may include initiating an inducer motor within the HVAC system. For example, one or more components (e.g., processor 410, memory 420, operation control component 142, or system operator 176) of the HVAC unit 110 may initiate the inducer motor 206 within the furnace 114.

At 304, the method 300 may include receiving an output airflow pressure of the inducer motor from a pressure sensor. For example, one or more components (e.g., processor 410, memory 420, operation control component 142, monitoring component 170, and/or information receiver 172) may receive an output airflow pressure of the inducer motor 206 via the pressure sensor 210.

At 306, the method 300 may also include sending a PWM signal to the inducer motor. For example, one or more components (e.g., processor 410, memory 420, operation control component 142, and/or system operator 176) of the HVAC unit 110 may send a PWM signal to the inducer motor 206. In an example, the PWM signal may correspond to a predetermined airflow pressure of the inducer motor 206 and received from the pressure sensor 210. In an example, the PWM signal may indicate a speed of the inducer motor 206.

At 308, the method 300 may include comparing the PWM signal to a baseline value. For example, one or more components (e.g., processor 310, memory 320, operation control component 142, monitoring component 170, and/or comparer 174) of the HVAC unit 110 may compare the PWM signal to a baseline value. In an example, the baseline value may indicate a baseline range of a PWM signal for the inducer motor 206. In some examples, the baseline value may correspond to an initial PWM signal recorded at an initial setup of the inducer motor 206, the furnace 114, and/or the HVAC unit 110.

At 310, the method 300 may also include controlling the inducer motor based on the comparing of the PWM signal to the baseline value. For example, one or more components (e.g., processor 310, memory 320, operation control component 142, and/or system operator 176) of the HVAC unit 110 may control the inducer motor 206 based on the comparing of the PWM-signal to the baseline value.

At 312, the method 300 may further include generating a status notification of the combustion airflow of the HVAC system in response to the comparing the PWM signal to the baseline value. For example, one or more components (e.g., processor 310, memory 320, operation control component 142, and/or notification component 178) of the HVAC unit 110 may generate a status notification of the combustion airflow 260 of the HVAC system 100 in response to the comparing the PWM signal to the baseline value.

In an aspect, the method 300 may include determining a deviation of the PWM signal from the baseline value. The controlling of the inducer motor and the generating of the status notification of the combustion airflow are further based on the deviation.

In some examples, when the deviation satisfies a first threshold, the controlling of the inducer motor may include operating the inducer motor in a normal state, and the status notification of the combustion airflow may be a normal status to indicate the combustion airflow is not blocked.

In some examples, when the deviation exceeds a first threshold, the controlling of the inducer motor may include operating the inducer motor in a warning state, and the status notification of the combustion airflow may be a warning status to indicate the combustion airflow is at least partially blocked.

In some examples, when the deviation exceeds a second threshold, the controlling of the inducer motor includes operating the inducer motor in a critical state (e.g., stopping the inducer motor 206), and the status notification of a combustion airflow may be a critical status to indicate the combustion airflow is largely blocked.

In some aspects, the method 300 may include transmitting the status notification of the combustion airflow to one or more of a display, a thermostat, or a mobile device. For example, a status notification may be displayed by the user interface 400 of the controller 140 via a status indicator 450, and/or transmitted to the mobile device 160 via email, text message, or any other method of notification.

Figure 4:
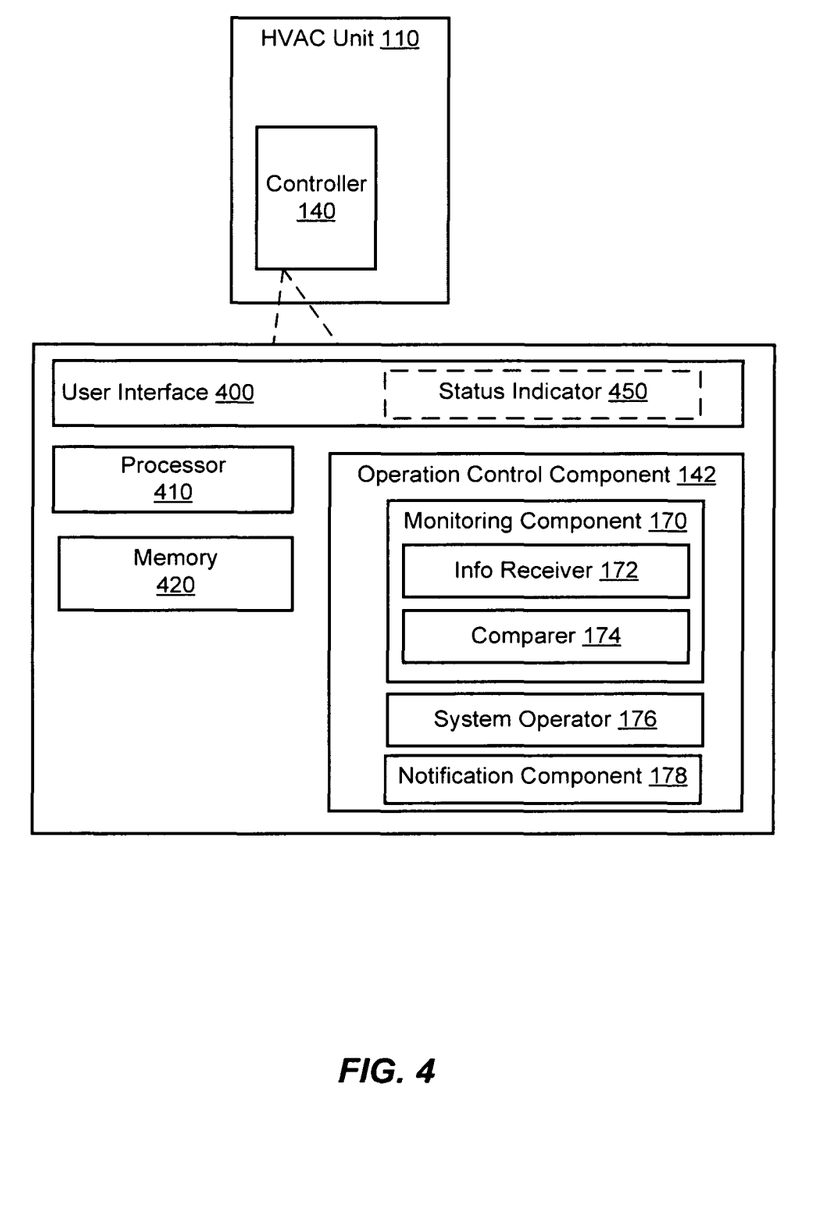
FIG. 4 is a block diagram of an example of components of the HVAC unit of FIG. 1, according to aspects of the present disclosure.

Referring to FIG. 4, the HVAC unit 110 and the controller 140 may include a variety of components, some of which have already been described herein. As shown, the controller 140 may also include a user interface 400, a processor 410, and a memory 420 which operate in conjunction to perform one or more functions described herein related to the faceless system control. The user interface 400 may operate to receive information from the processor 410 and communicate the information to a user. In an example, the user interface 400 may include one or more lights, speakers, or displays to communicate the information to the user. In an example, the user interface 400 may include a status indicator 450 to indicate one or more status notifications from the notification component 178 such as a normal status, a warning status, or a critical status of the combustion airflow 260. The processor 410 may be one or more processors configured to control the HVAC unit 110 and perform one or more functions described herein.

The memory 420 may be configured to store data (e.g., setpoint information 420, operational settings 422) used herein and/or functions and operations performed by the processor 410 and/or the operation control component 142.

The memory 420 may include any type of computer-readable medium usable by a computer or at least one processor 420, such as random access memory (RAM), read only memory (ROM), tapes, magnetic discs, optical discs, volatile memory, non-volatile memory, and any combination thereof. In an aspect, the memory 420 may be a non-transitory computer-readable storage medium that stores one or more computer-executable codes defining the operation control component 142 and/or one or more of subcomponents of the operation control component 142, and/or data associated therewith, when HVAC unit 110 is operating the processor 410 to execute the operation control component 142 and/or one or more of subcomponents.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A heating, ventilation, and air conditioning (HVAC) system, comprising:
   a burner configured to generate a combustion airflow;
   a heat exchanger comprising a tube configured to direct the combustion airflow therethrough and place the combustion airflow in a heat exchange relationship with a supply airflow directed across the tube of the heat exchanger;
   an inducer motor configured to draw the combustion airflow through the tube of the heat exchanger;
   a pressure sensor configured to measure an output airflow pressure of the combustion airflow drawn through the tube of the heat exchanger via the inducer motor;

a memory; and a processor coupled with the memory and configured to:
initiate the burner and the inducer motor within the HVAC system to provide the combustion airflow through the tube of the heat exchanger;
establish an initial pulse width modulation (PWM) signal sent to the inducer motor as a baseline PWM signal, wherein the initial PWM signal corresponds to a predetermined airflow pressure of the combustion airflow drawn through the tube of the heat exchanger via the inducer motor;
send a PWM signal to the inducer motor associated with a monitored output airflow pressure of the combustion airflow;
compare the PWM signal to the baseline PWM signal in response to the monitored output airflow pressure of the combustion airflow reaching the predetermined airflow pressure of the combustion airflow;
control the inducer motor based on a comparison of the PWM signal and the baseline PWM signal; and
generate a status notification of the combustion airflow drawn through the tube of the heat exchanger in response to the comparison of the PWM signal and the baseline PWM signal.

2. The HVAC system of claim 1, wherein the initial PWM signal further indicates a speed of the inducer motor at the predetermined airflow pressure.

3. The HVAC system of claim 1, wherein the baseline PWM signal indicates a baseline range of the initial PWM signal for the inducer motor at the predetermined airflow pressure.

4. The HVAC system of claim 1, wherein the processor is further configured to:
determine a deviation of the PWM signal from the baseline PWM signal;
control the inducer motor based on the deviation; and
generate the status notification of the combustion airflow based on the deviation.

5. The HVAC system of claim 4, wherein the processor is further configured to:
determine the deviation satisfies a first threshold;
operate the inducer motor in a normal state based on the deviation satisfying the first threshold; and
generate the status notification of the combustion airflow as a normal status to indicate the combustion airflow is not blocked based on the deviation satisfying the first threshold.

6. The HVAC system of claim 4, wherein the processor is further configured to:
determine the deviation exceeds a first threshold;
operate the inducer motor in a warning state based on the deviation exceeding the first threshold; and
generate the status notification of the combustion airflow as a warning status to indicate the combustion airflow is at least partially blocked based on the deviation exceeding the first threshold.

7. The HVAC system of claim 6, wherein the processor is further configured to:
determine the deviation exceeds a second threshold;
operate the inducer motor in a critical state based on the deviation exceeding the second threshold; and
generate the status notification of the combustion airflow as a critical status to indicate the combustion airflow is largely blocked based on the deviation exceeding the second threshold.

8. The HVAC system of claim 1, wherein the processor is further configured to:
transmit the status notification of the combustion airflow to one or more of a display, a thermostat, or a mobile device.

9. A method for generating a status notification of a combustion airflow by a heating, ventilation, and air conditioning (HVAC) system, comprising:
initiating a burner and an inducer motor of a furnace of the HVAC system, wherein the burner is configured to generate the combustion airflow and the inducer motor is configured to draw the combustion airflow through a tube of a heat exchanger of the furnace;
establishing an initial pulse width modulation (PWM) signal sent to the inducer motor as a baseline value, wherein the initial PWM signal corresponds to a predetermined airflow pressure of the combustion airflow drawn through the tube of the heat exchanger via the inducer motor;
receiving a monitored output airflow pressure of the combustion airflow drawn through the tube of the heat exchanger via the inducer motor from a pressure sensor;
sending a PWM signal to the inducer motor associated with the monitored output airflow pressure of the combustion airflow;
comparing the PWM signal to the baseline value in response to the monitored output airflow pressure of the combustion airflow reaching the predetermined airflow pressure of the combustion airflow;
controlling the inducer motor based on a comparison of the PWM signal and the baseline value; and
generating the status notification of the combustion airflow drawn through the tube of the heat exchanger in response to the comparison of the PWM signal and the baseline value.

10. The method of claim 9, wherein the initial PWM signal further indicates a speed of the inducer motor at the predetermined airflow pressure.

11. The method of claim 9, wherein the baseline value indicates a baseline range of the initial PWM signal for the inducer motor at the predetermined airflow pressure.

12. The method of claim 9, further comprising:
determining a deviation of the PWM signal from the baseline value, wherein controlling the inducer motor and generating the status notification of the combustion airflow are further based on the deviation.

13. The method of claim 12, further comprising:
determining the deviation satisfies a first threshold, wherein controlling the inducer motor includes operating the inducer motor in a normal state based on the deviation satisfying the first threshold, and wherein generating the status notification of the combustion airflow includes generating a normal status to indicate the combustion airflow is not blocked.

14. The method of claim 12, further comprising:
determining the deviation exceeds a first threshold, wherein controlling the inducer motor includes operating the inducer motor in a warning state based on the deviation exceeding the first threshold, and wherein generating the status notification of the combustion airflow includes generating a warning status to indicate the combustion airflow is at least partially blocked.

15. The method of claim 14, further comprising:
determining the deviation exceeds a second threshold, wherein controlling the inducer motor includes operating the inducer motor in a critical state based on the deviation exceeding the second threshold, and wherein generating the status notification of the combustion airflow includes generating a critical status to indicate the combustion airflow is largely blocked.

16. The method of claim 9, wherein generating the status notification of the combustion airflow includes transmitting the status notification of the combustion airflow to one or more of a display, a thermostat, or a mobile device.

17. A non-transitory, computer-readable medium storing computer executable code for generating a status notification of a combustion airflow by a heating, ventilation, and air conditioning (HVAC) system, comprising code to:
   initiate a burner and an inducer motor within the HVAC system, wherein the burner is configured to generate the combustion airflow and the inducer motor is configured to draw the combustion airflow through a tube of a heat exchanger of the HVAC system;
   establish an initial pulse width modulation (PWM) signal sent to the inducer motor as a baseline value, wherein the initial PWM signal corresponds to a predetermined airflow pressure of the combustion airflow drawn through the tube of the heat exchanger via the inducer motor;
   receive a monitored output airflow pressure of the combustion airflow drawn through the tube of the heat exchanger via the inducer motor from a pressure sensor;
   send a PWM signal associated with the monitored output airflow pressure of the combustion airflow to the inducer motor;
   compare the PWM signal to the baseline value in response to the monitored output airflow pressure of the combustion airflow reaching the predetermined airflow pressure of the combustion airflow;
   control the inducer motor based on a comparison of the PWM signal and the baseline value; and
   generate the status notification of the combustion airflow drawn through the tube of the heat exchanger in response to the comparison of the PWM signal and the baseline value.

18. The non-transitory, computer-readable medium of claim 17, wherein the initial PWM signal further indicates a speed of the inducer motor at the predetermined airflow pressure.

19. The non-transitory, computer-readable medium of claim 17, wherein the code is configured to:
   determine a deviation of the PWM signal from the baseline value;
   determine the deviation satisfies a first threshold;
   generate a normal status notification based on the deviation satisfying the first threshold;
   determine the deviation exceeds the first threshold; and
   generate a warning status notification based on the deviation exceeding the first threshold.

20. The non-transitory, computer-readable medium of claim 19, wherein the code is configured to:
   determine the deviation exceeds a second threshold; and
   generate a critical status notification based on the deviation exceeding the second threshold.

* * * * *